Feb. 15, 1966   C. E. QUINN   3,235,025
COLLISION PREVENTION SYSTEM
Filed April 20, 1964   2 Sheets-Sheet 1
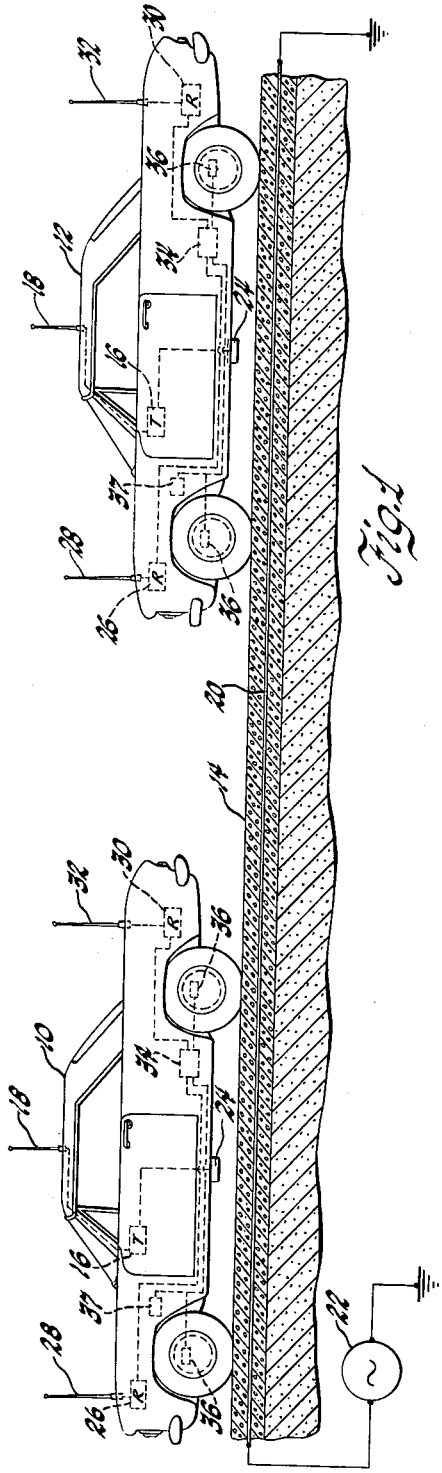
Fig.1
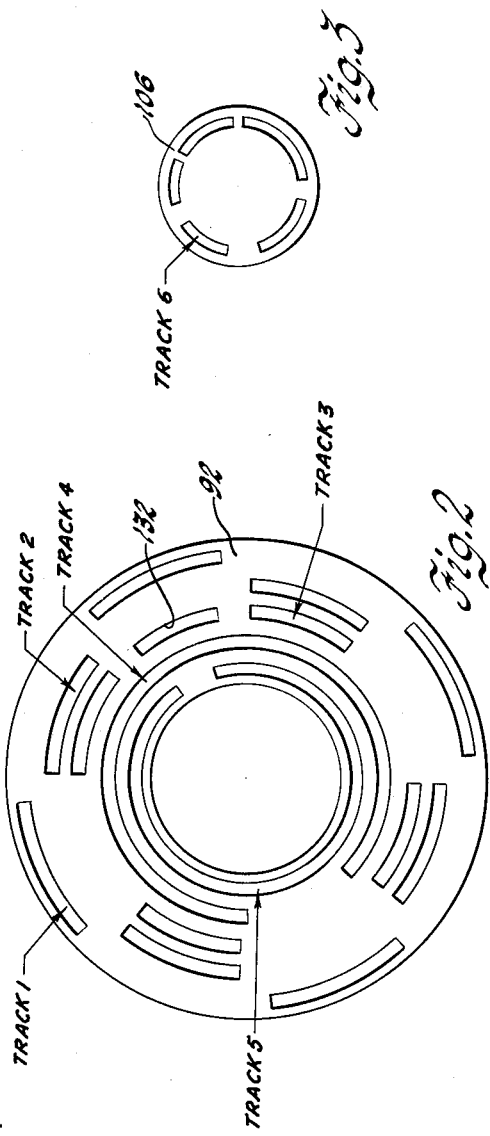
Fig.2
Fig.3
INVENTOR.
Clark E. Quinn
BY
Hugh L. Fisher
ATTORNEY

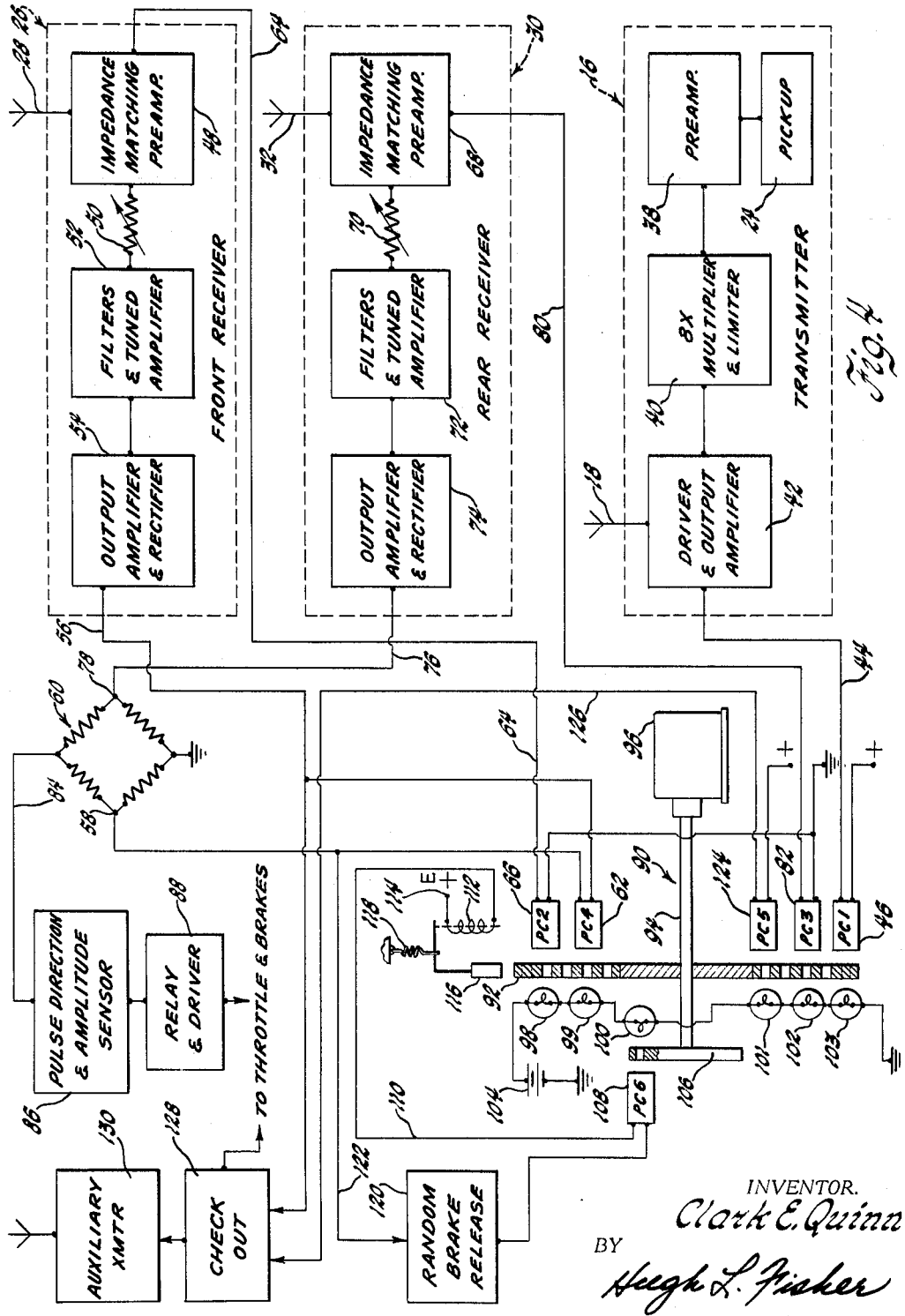

United States Patent Office 3,235,025
Patented Feb. 15, 1966

3,235,025
COLLISION PREVENTION SYSTEM
Clark E. Quinn, Rochester, Mich., assignor to General Motors Corporation, Detroit, Mich., a corporation of Delaware
Filed Apr. 20, 1964, Ser. No. 360,897
9 Claims. (Cl. 180—82.1)

This invention relates to the automatic control of vehicles and, more particularly, to apparatus for preventing collisions between two or more similarly equipped vehicles in a system of automatic vehicle control.

Many inventions have been made with the object of providing a system for automatically steering and controlling the speed of an automotive vehicle such as a cargo carrier or a passenger car. So that the driver of the vehicle might be completely relieved of the burden of attending to the safe travel of the vehicle, or that the driver may be completely omitted, it is necessary to a system of automatic vehicular control to insure that collisions do not occur between vehicles traveling at different speeds in the same direction on a common path.

In accordance with the present invention, collisions between two or more automotive vehicles which are operated in a system of similarly equipped vehicles traveling a common roadway are prevented by indicating the proximity of two vehicles to the rearward vehicle so that the speed of that vehicle may be decreased. This is accomplished by providing each vehicle in the system with a source of identifying signals in the form of an omnidirectional transmitter. To receive and to interpret the transmitted signals from another vehicle, each vehicle is further equipped with first and second omnidirectional receivers mounted forwardly and rearwardly, respectively, on the vehicle. Each of the receivers is responsive to the transmitted signal to develop a signal quantity related in magnitude to the distance between the particular receiver and the source of signals received. The signal quantities developed by the receivers are compared to develop a signal indicating the necessity for decreasing the speed of the vehicle whenever the signal quantity from the forwardly mounted receiver is greater than that from the rearwardly mounted receiver. Thus, the necessity for slowing a vehicle down is indicated only by what is determined to be an improper proximity to a forward vehicle traveling on the same roadway.

Through the present invention the character of the identifying signals from each of the transmitters may be standardized by operating each transmitter at the same frequency. To insure that each vehicle equipped with both transmitter and receiver means does not mistake its own identification signal from that of another vehicle, control means may be provided on each vehicle for time sharing the operation of the transmitter and receiver means.

In accordance with the invention, the possibility of a failure of the system of one vehicle to recognize the signal of another due to a spurious synchronization of the transmit and receive times between the two vehicles is prevented. This is accomplished by control means carried by each vehicle for time sharing the operation of the transmitter and receiver means and timing means associated with the control means for randomly varying the respective periods of signal transmission and receipt during the "finding" portion of operation during which each of the vehicles seek the presence of another. The timing means is, however, responsive to the receipt of a signal from another vheicle's transmitter to change from a random operation to a synchronous operation in which the transmit and receive times are regularly occurring. Accordingly, each of the vehicles in the system transmits and receives on an irregular cycle until such vehicle comes within the area of influence of the transmitter of another vehicle. At this time, each of the vehicles changes from the random to the synchronous operation thereby to lock in on one another such that one vehicle receives while the other transmits information.

The invention further provides for periodically checking out the proper operation of the transmitting and receiving system. This is accomplished by means for periodically energizing both the transmitter and receiver means of the vehicle so that the vehicle effectively listens for its own signal. Means are provided on the vehicle responsive to the absence of a signal during this period to indicate a failure in the system and the need for terminating the further operation of this particular vehicle in the system.

The invention, as well as the particular means for carrying out the invention, may be best understood by reference to the following specification which describes the construction and operation of a specific embodiment of the invention. This specification is to be taken with the accompanying drawings of which:

FIGURE 1 illustrates the invention as applied to a system of automobiles traveling in the same direction on a common roadway;

FIGURE 2 is a plan view of a timing disk which is part of the control system of the embodiment of the invention;

FIGURE 3 is a plan view of a timing disk which is part of the timing means of the embodiment of the invention; and FIGURE 4 is a diagram of the overall system illustrating the specific embodiment of the invention.

Referring now to FIGURE 1, a leading vehicle 10 and a trailing vehicle 12 are shown situated for travel in the same direction on a roadway 14. The vehicles 10 and 12 are similarly equipped for operation within the system prescribed by the present invention, and, thus, corresponding apparatus on the vehicles is identified with a common reference character. The apparatus carried by each of the vehicles 10 and 12 includes a transmitter 16 connected to an omnidirectional transmitting antenna 18 mounted on the roof of the vehicle for transmitting signals of a preassigned frequency. This frequency may be determined by the combination of a cable 20 which is buried in the roadway 14 along the path of travel and a source 22 of A.C. current which is connected to the cable 20 to set up a field around the cable 20 which extends above surface of the roadway 14. A magnetic pickup 24 is mounted near the bottom of each of the vehicles and connected into the transmitter 16 for determining the frequency of operation thereof. All of the vehicles in the system thus transmit on the same frequency. In addition the transmitters 16 are preset so as to transmit in phase aiding relation such that signals from one vehicle will not cancel those of another vehicle. To facilitate this aiding phase relation the transmitters of the present system broadcast an induction field signal having a wavelength of approximately 25,000 meters. The cable 20 may also serve the purpose of defining a desired path of vehicle travel in the event the vehicles 10 and 12 are equipped for automatic guidance and/or speed control. However, this extension is not part of the present invention.

Each of the vehicles is further equipped with a front receiver 26 and an omnidirectional receiving antenna 28 connected to the receiver 26 and mounted on the forward part of the vehicle. The vehicle apparatus further includes a rear receiver 30 and an omnidirectional receiving antenna 32 mounted adjacent the rearward portion of the vehicles. Each of the receivers 26 and 30 is effective to produce an output signal which is proportional to the distance between the receiving antenna and a transmitting antenna of another vehicle. The output signals produced by the receivers 26 and 30 are connected to a unit 34 which represents a central circuit box including control and timing means for the system which is further described in greater detail with reference to FIGURE 4. The unit 34, as will be further described, contains comparison means for comparing the magnitude of the signal from the front receiver 26 with that of the rear receiver 30 and for producing an output signal of predetermined character corresponding to the magnitude difference between the signals. Depending upon the character of this signal, signals are sent to brake control units 36 and throttle control unit 37 for operating the brakes of the vehicle and closing the throttle whenever the signal from the front receiver 26 exceeds that from the rear receiver 30 by a predetermined.

Briefly summarizing the operation of the system as illustrated in FIGURE 1, each of the vehicles 10 and 12 proceeds along the roadway 14 in the same direction transmitting and receiving signals of a frequency determined by the frequency of the source 22. The transmitting and receiving operations of each of the vehicle systems is performed in a time-sharing fashion as will be further described in the following. The antennas 28 and 32 pick up the transmitted signals from vehicles within the range of the transmitter 16 and present signals to the circuitry contained in unit 34 related to the distance between the particular receiving antenna and the transmitting antenna from which signals are received. Assuming that the vehicle 12 approaches vehicle 10 from the rear as shown, it can be seen that the front antenna 28 of the trailing vehicle 12 is closer to the transmitting antenna 18 of the lead vehicle 10 than is the rearward antenna 32. However, the reverse is true for the combination of receiving antennas on the lead vehicle 10. When the magnitude difference between the front and rear receiver signals from the vehicle 12 reaches a predetermined value, which is set in accordance with the stopping ability of each of the vehicles, an output signal is delivered from the circuitry of unit 34 to the brake control unit 36 and the throttle control unit 37 of the trailing vehicle 12 such that a collision is prevented. Since there is no necessity of operating the brakes of the forward vehicle 10, the circuitry contained in unit 34 determines that the signal from the rear antenna 32 exceeds that of the front antenna 28 and by means of a simple polarity discrimination, for example, the brake and throttle control units of the forward vehicle 10 are not operated.

Referring now to FIGURE 4, the system is shown in greater detail to comprise a transmitter 16 including a pickup 24 corresponding to the similarly numbered element shown in FIGURE 1. The pickup 24 is connected to a preamplifier 38 for amplifying the signals received from the roadway cable 20 shown in FIGURE 1. The output of the preamplifier 38 is connected through a frequency multiplier 40 which increases the frequency by a factor of eight for transmission purposes. The output of the multiplier 40 is connected to a driver and output amplifier 42 which is in turn connected to the omnidirectional transmitting antenna 18. For time-sharing purposes, as will be further explained in the following, an enabling circuit 44 including a photocell 46 is connected into the driver and output amplifier 42 for periodically discontinuing the operation of the transmitter 16.

The front receiver 26, also shown in FIGURE 4, includes an omnidirectional antenna 28. The antenna 28 is connected into a preamplifier 48 for matching the antenna 28 impedance to the input of an amplifier 52. The preamplifier 48 is connected through a resistive attenuator 50 to a filter and tuned amplifier circuit 52 and a rectifier 54. The output signal from the front receiver 26 is then connected through a conductor 56 to an input point 58 on one side of a comparison bridge circuit 60 through a photocell 62. For time-sharing purposes, to be described further in the following, an enabling circuit 64 is connected between the preamplifier 48 and ground and includes a photocell switch 66. The circuit 64 is effective to periodically discontinue the operation of the front receiver 26.

The rear receiver 30 is similar to the front receiver and includes antenna 32, a preamplifier 68 connected through a resistive attenuator 70 to the series combination of amplifier 72 and rectifier 74. The output of the rear receiver 30 is connected via conductor 76 to an input point 78 of the comparison bridge circuit 60. Note that the input point 78 is diagonally opposite input point 58 which is connected to the output of the front receiver 26. Further, the output of the rectifier 74 is of opposite polarity to the output of rectifier 54. Thus an effective comparison of the signal amplitudes of the outputs of the front and rear receivers can be made by means of the comparison bridge 60. For time-sharing purposes the preamplifier 68 is connected to an enabling circuit 80 which includes a photocell 82. As will be described in the following, photocell 82 acts as a switch to periodically discontinue the operation of the rear receiver 30.

The output of the comparison bridge 60 is connected by way of conductor 84 to the input of a pulse direction and amplitude sensor 86, which determines the position of the receiving vehicle with respect to the transmitting vehicle, by noting the polarity and magnitude of the bridge output. Obviously, a trailing vehicle produces a bridge output of opposite polarity from that of a leading vehicle. The output of the sensor 86 is connected to a relay driver 88 which is in turn connected to the brake and throttle control units 36 and 37 shown in FIGURE 1.

As stated above, the transmitters and receivers of each of the vehicles in the system are operated on a time-sharing basis such that no vehicle transmits and receives at the same time, with one exception which will be described later. To control this time-sharing operation, a control means, generally designated at 90 is shown in FIGURE 4 to include a disk 92 of opaque material having a plurality of slots or windows placed therein to define five tracks as better shown in FIGURE 2. The opaque disk 92 is mounted for rotation on a shaft 94 which is rotated by a synchronous motor 96. Disposed on the left side of the disk 92 as shown in FIGURE 4 is a plurality of lamps 98, 99, 100, 101, 102 and 103 connected in series with a source indicated at 104. The lamps are so disposed as to illuminate the associated photocells shown in FIGURE 4 whenever a slot in the track associated with each of the lamps is adjacent the lamp. In this manner, rotation of the disk 92 by the motor 96 is effective to open and close circuits through the photocells in a sequence dependent upon the arrangement of the slots in the disk 92.

Referring specifically to FIGURE 2, the disk 92 is provided with slots defining five tracks which control the operation of five associated photocells as shown in FIGURE 4. Only the first three tracks, which control the transmitting and receiving operations, are described for the present. Track 1, which is the outermost track, includes four slots of equal length which are disposed at 90° intervals about the disk 92. Referring to FIGURE 4, photocell 46, which is also identified as PC1, corresponding with track 1, is disposed adjacent the slots in the first track so as to be periodically illuminated by lamp 103. Photocell 46 completes the circuit 44 for the transmitter 16 such that the transmitter on each vehicle is actuated four times during each complete revolution of the disk 92 on the shaft 94.

Referring again to FIGURE 2, it may be seen that tracks 2 and 3 each comprise four slots at parallel positions and disposed directly intermediate the slots in track 1. Photocells 66 and 82, which are respectively labeled PC2 and PC3, corresponding with tracks 2 and 3, complete the enabling circuits 64 and 80 to the front and rear receivers 26 and 30, respectively. Thus, photocells 66 and 82, which are adjacent the slots in tracks 2 and 3, will periodically and simultaneously turn off and on the front and rear receivers to listen for transmitted signals from other vehicles. Because of the staggered position of the slots in tracks 1, 2 and 3, the time-sharing of transmitting and receiving periods is accomplished.

Should all of the vehicles in a system as prescribed by the present invention be transmitting and receiving on the same cycle length as described above, it is possible that two vehicles may be transmitting at the same and receiving at the same time. In such an instance, neither vehicle would recognize the other and the collision prevention feature of the present invention would not be accomplished. Accordingly, the invention further includes timing means in the form of a small disk 106 of opaque material mounted for rotation on the shaft 94 and having formed therein a plurality of randomly disposed slots as better shown in FIGURE 3. The slots in the disk 106 form track 6 which controls the operation of a photocell 108 (PC6) which is disposed adjacent the disk 106 as shown in FIGURE 4. The photocell 108 is periodically illuminated by a lamp 100 to complete a circuit 110 to a solenoid coil 112 from a D.C. supply source indicated at 114. The solenoid coil 112 is effective to displace a brake shoe 116 against the action of a spring 118. The brake shoe 116, when actuated by the solenoid coil 112 is displaced so as to contact the periphery of the disk 92. The disk 92 is, as shown in the drawing, mounted on the shaft 94 such that when no brake force is applied to the disk, it will rotate with the shaft 94. However, when the brake shoe 116 comes in contact with the periphery of the disk 92 it will slip on the shaft 94. Accordingly, it can be seen that as the randomly disposed slots in track 6 of disk 106 rotate past the combination of lamp 100 and photocell 108, the solenoid coil 112 will be periodically energized to impart a random motion to the rotation of disk 92. This random motion in turn tends to randomize the transmitting and receiving times which are defined by the position of the slots in tracks 1, 2 and 3 of the disk 92. It has been found that the braking action of shoe 116 on disk 92 is sufficiently different as between different vehicles to insure that each vehicle transmits and receives on a completely random basis, thereby eliminating the possibility of an unwanted synchronization of the transmitting and receiving times of two vehicles during the hunting or finding portion of operation.

Whenever two vehicles such as 10 and 12 shown in FIGURE 1 come within a predetermined distance of one another, the random operation of the control means 90 is suspended and the system is switched to a synchronous operation. This is accomplished by means of a random brake release circuit operation. This is accomplished by means of a random brake release circuit 120 which is also connected in the circuit 110 with photocell 108. The random brake release receives an actuating input signal on a line 122 which is connected through photocell 62 to the output conductor 56 of the front receiver 26. So connected, the output of the front receiver 26, upon receiving a signal of predetermined amplitude, is effective to energize a solenoid in the random brake release circuit 120 which open-circuits the circuit 110 through photocell 108 and the solenoid coil 112. Since the random brake release 120 is connected to only one of the receivers, that being the front receiver 26, it can be seen that no comparison of voltages or signals from the receiver is required to deenergize the brake circuit including the solenoid coil 112 and the brake shoe 116. Accordingly, any vehicle may be switched from the random to the synchronous operation merely by coming within the range of the transmitter of another vehicle. Thus, two vehicles, upon encountering one another, will switch from the random to the synchronous operation and, thereby, lock in on each other in such a fashion that one vehicle will transmit signals while the other vehicle receives.

To insure that the transmitting and receiving apparatus of each of the vehicles is operating properly, the system shown in FIGURE 4 provides means for periodically checking out this operation, once for each revolution of the disk 92. This is accomplished by means of tracks 4 and 5 in the disk 92. Referring to FIGURE 2, it can be seen that track 4 includes a single slot which defines an opaque portion of only about 50°. Similarly, track 5 includes a single slot defining an opaque portion which subtends an angle of approximately 30°. As shown in FIGURE 4, track 4 controls operation of a photocell 62 (PC4) in combination with lamp 99 and track 5 controls the operation of a photocell 124 (PC5) in combination with the lamp 101. Photocell 62 completes a circuit from the output of front receiver 26 to the input point 58 of bridge 60. Photocell 124 completes a circuit from a D.C. source as indicated through the conductor 126 to a check out circuit 128. Similarly, the output of the front receiver is connected via conductor 56 to a second input of the check out circuit 128 for purposes to be described. The check out circuit 128 is connected both to the brake control unit 36 shown in FIGURE 1 and to a throttle control unit 37 as previously described for discontinuing the operation of the vehicle whenever the system is shown to be operating improperly. The check out circuit 128 is also connected to an auxiliary transmitter 130 which is actuated by a signal from the check out circuit whenever the system of FIGURE 4 is shown to be operating improperly. The auxiliary transmitter 130 provides constant output signals which may be radiated from the automobile to avoid a "sitting duck" condition.

Describing the operation of the check out feature of the invention, reference to FIGURE 2 shows that track 3 is provided with a sampling slot 132 which is disposed intermediate the two regular front receiver slots. Whenever slot 132 is intermediate lamp 102 and photocell 82, the front receiver is actuated. This occurs as seen in FIGURE 2 at the same time a slot in track 1 actuates the transmitter 16 via enabling circuit 44 and photocell 46. Thus, for the short period defined by slot 132, both the transmitter 16 and the front receiver 26 are enabled. Normally, a signal at the output of the front receiver 26 would drop out the relay in the random brake release 120, thus, switching the control system to the synchronous operation and also set the vehicle brakes and throttle by means of the circuit through photocell 62, comparison bridge 60, pulse direction amplitude sensor 86 and the relay driver 88. However, the opaque segment of track 4 comes between lamp 99 and photocell 62 at the same time the sample slot 132 comes between lamp 102 and photocell 82. Thus, the circuit through photocell 62 is opened such that, for the short duration of the sample period, the comparison bridge 60 is unable to operate the throttle and brakes and, similarly, the random brake release 120 may not be released. During the sample period, the opaque portion of track 5 also comes between the lamp 101 and photocell 124 to disconnect the D.C. source from conductor 126 leading into the check out circuit 128. At this point a relay contained in the check out circuit 128 may drop out, thus, setting the vehicle throttle and brakes and turning on the auxiliary transmitter 130 unless a signal is received on conductor 56 at the second input of the check out circuit 128. In the event such a signal is received from the front transmitter 126, the relay in the check out circuit 128 is prevented from dropping out inasmuch as the presence of the output signal indicates that both the transmitter 16 and the front receiver 26 are operating properly.

Briefly summarizing the operation of the embodiment of the invention shown in the accompanying drawings, each of the vehicles in a multi-vehicle system proceeds along a common roadway alternating transmitting signals from transmitter 16 and listening for signals from other vehicles via receivers 26 and 30. Whenever no signals are received, this time-sharing operation continues on a random basis as defined by the plurality of randomly located apertures in track 6 of the disk 106. Whenever a signal is received on the front receiver 26, timing means operate to disable the operation of the brake including solenoid coil 112 and brake shoe 116 such that the timing disk 92 is allowed to rotate freely with shaft 94, thus switching the time-sharing operation to a synchronous mode. If the two vehicles which have similarly accomplished the random to synchronous switching operation in the respective systems continue to converge, the comparison of front and rear receiver signals in the trailing vehicle will, at a predetermined amplitude of the differential signal from bridge 60 actuate the brakes and throttle of the rearward vehicle so as to prevent a collision. Should the transmitter or front receiver of any vehicle fail to operate properly during the sample period defined by slot 132 in track 3, the absence of a signal from the front receiver 26 on output conductor 56 will allow a relay in a check out circuit 128 to drop out, thus setting the brakes of the vehicle, closing the throttle and turning on auxiliary transmitter 130.

Should a third vehicle approach two vehicles which have locked onto one another, the third vehicle will lock onto the vehicle immediately ahead of it. Thus, the first and third vehicles transmit at the same time. This condition emphasizes the need for a phase aiding signal relationship as described above, to assure that the two transmitted signals do not cancel out at the receiving vehicle due to phase opposition.

It is to be understood that the foregoing description relates to a specific embodiment of the invention illustrating the various features thereof, and inasmuch as the various modifications may be made to the circuit and other apparatus described above without departing from the spirit and scope of the invention, this description is not to be construed in a limiting sense. For a definition of the invention, reference should be had to the appended claims.

What is claimed is:

1. In a system for preventing collisions between automotive vehicles carrying signal transmitter means and traveling along a common path; receiving apparatus carried by a first vehicle and including first omnidirectional receiver means forwardly mounted on the vehicle and responsive to a signal transmitted from a second vehicle to develop a first signal quantity related in magnitude to the distance between the first receiver means and the second vehicle, second receiver means rearwardly mounted on the first vehicle and responsive to a signal transmitted from the second vehicle to develop a second signal quantity related in magnitude to the distance between the second receiver means and the second vehicle, and comparison means connected to receive the first and second signal quantities and to develop an output signal indicating the necessity for decreasing the speed of the first vehicle whenever the first signal quantity is greater than the second signal quantity.

2. Apparatus as defined in claim 1 including omnidirectional signal transmitter means mounted on the first vehicle, and control means carried by the vehicle and connected to the transmitter means and to the first and second receiver means for time sharing the operation of the transmitter and receiver means.

3. Apparatus as defined in claim 1 including means connected to receive said output signal quantity and to operate the throttle of the first vehicle so as to effect a decrease in the speed thereof.

4. In a system for preventing collisions between automotive vehicles equipped with brakes and carrying signal transmitter means, receiving apparatus carried by a first vehicle and including first omnidirectional receiver means forwardly mounted on the vehicle and responsive to a signal transmitted from a second vehicle to develop a first signal quantity related in magnitude to the distance between the first receiver means and the second vehicle, second receiver means rearwardly mounted on the first vehicle and responsive to a signal transmitted from the second vehicle to develop a second signal quantity related in magnitude to the distance between the second receiver means and the second vehicle, comparison means connected to receive the first and second signal quantities and to develop an output signal indicating the necessity for decreasing the speed of the first vehicle whenever the first signal quantity is greater than the second signal quantity, and means connected to receive said output signal quantity and to actuate the brakes of the first vehicle.

5. In a system of vehicular traffic, apparatus carried by each of the vehicles for preventing collisions between vehicles traveling a common path including omnidirectional transmitter means for transmitting a signal from the vehicle, first omnidirectional receiver means forwardly mounted on the vehicle and responsive to signals from a transmitter means to develop a first signal quantity related in magnitude to the distance between the transmitter means and the first receiver means, second omnidirectional receiver means rearwardly mounted on the vehicle and responsive to signals from a transmitter means to develop a second signal quantity related in magnitude to the distance between the transmitter means and the second receiver means, comparison means connected to receive the first and second signal quantities and to develop an output signal quantity indicating the necessity of decreasing the speed of the vehicle whenever the first signal quantity is greater than the second, control means connected to the transmitter means and the first and second receiver means for time sharing the operation thereof, the control means including timing means to normally vary the respective periods of operation of the transmitter and receiver means in a random fashion and release means responsive to the presence of an output signal quantity from one of the receiver means to disable the timing means whereby the respective periods of operation of the transmitter and receiver means are thereafter varied in a synchronous fashion.

6. A system of vehicular traffic as defined in claim 5 wherein said common path is defined by a conductor connected to a source of alternating current of a predetermined frequency, each of the vehicles further carrying pickup means inductively coupled to the conductor and connected to the transmitter means whereby each of the vehicles in the system transmits from said transmitter means a signal at a frequency related to said predetermined frequency.

7. In a system of vehicular traffic, apparatus carried by each of the vehicles for preventing collisions between vehicles traveling a common path including omnidirectional transmitter means for transmitting a signal from the vehicle, first omnidirectional receiver means forwardly mounted on the vehicle and responsive to signals from a transmitter means to develop a first signal quantity related in magnitude to the distance between the transmitter means and the first receiver means, second omnidirectional receiver means rearwardly mounted on the vehicle and responsive to signals from a transmitter means to develop a second signal quantity related in magnitude to the distance between the transmitter means and the second receiver means, comparison means connected to receive the first and second signal quantities and to develop an output signal quantity indicating the necessity of decreasing the speed of the vehicle whenever the first signal quantity is greater than the second, timing control means for time sharing the operation of the transmitter and receiver means including circuit breaker means in the form of a plurality of photocells connected in respective electrical circuits linking the transmitter means and the first and second receiver means, means for producing light for illuminating the photocells and a rotatable shutter for alternately enabling the transmitter and receiver means, means for driving the shutter at a constant speed, means for randomly braking the shutter to prevent rotation at said constant speed and means responsive to the presence of a signal at one of the receiving means to disable the last mentioned means thereby to restore the constant speed of rotation to the shutter.

8. In a system of vehicular traffic including a plurality of vehicles equipped with motive power means and brakes, means carried by each of the vehicles for preventing collisions between vehicles traveling in the same direction on a common path, first omnidirectional receiver means forwardly mounted on the vehicle and responsive to signals from a transmitter means to develop a first signal quantity related in magnitude to the distance between the transmitter means and the first receiver means, second omnidirectional receiver means rearwardly mounted on the vehicle and responsive to signals from a transmitter means to develop a second signal quantity related in magnitude to the distance between the transmitter means and the second receiver means, comparison means connected to receive the first and second signal quantities and to develop an output signal quantity indicating the necessity of decreasing the speed of the vehicle whenever the first signal quantity is greater than the second, control means connected to the transmitter means and the first and second receiver means for time sharing the operation thereof, the control means including timing means to normally vary the respective periods of operation of the transmitter and receiver means in a random fashion and release means responsive to the presence of an output signal quantity from one of the receiver means to disable the timing means whereby the respective periods of operation of the transmitter and receiver means are thereafter varied in a synchronous fashion, and apparatus for determining the proper operation of the transmitter means including means operatively associated with said timing means for simultaneously actuating the transmitter means and said one of the receiver means at predetermined intervals, and means responsive to the absence of a signal quantity from said one of the receiver means to apply the vehicle brakes.

9. Apparatus as defined in claim 8 including an auxiliary transmitter means, and means responsive to the absence of a signal quantity from said one of the receiver means to activate the auxiliary transmitter means.

References Cited by the Examiner

UNITED STATES PATENTS

| 2,509,331 | 5/1950 | Brannen | 180—82 X |
| 2,762,913 | 9/1956 | Jepson | 180—82 X |
| 2,851,120 | 9/1958 | Fogiel | 180—82.1 |
| 2,974,304 | 3/1961 | Nordlund | 180—82.1 X |

BENJAMIN HERSH, *Primary Examiner*.